United States Patent

Vaughn

[15] 3,687,909
[45] Aug. 29, 1972

[54] REACTIVE BETA-LACTONE-CONTAINING POLYMERS AND A METHOD FOR THEIR PREPARATION

[72] Inventor: Walter L. Vaughn, Angleton, Tex. 77515

[73] Assignee: The Dow Chemical Company, Midland, Mich.

[22] Filed: Feb. 9, 1970

[21] Appl. No.: 11,361

[52] U.S. Cl. ............260/80.78, 260/80.8, 260/80.81, 260/88.1 PC, 260/88.1 R, 260/89.5 S, 260/239.57

[51] Int. Cl. .............................................. C08f 15/40

[58] Field of Search.....260/80.78, 80.8, 88.1 R, 88.1 PC, 260/78.3 UA, 89.5 S

[56] References Cited

UNITED STATES PATENTS

| | | | |
|---|---|---|---|
| 3,056,764 | 10/1962 | Bonnette | 260/78.4 |
| 3,404,134 | 10/1968 | Rees | 260/78.4 |
| 3,441,545 | 4/1969 | Blatz | 260/78.5 |
| 3,471,460 | 10/1969 | Rees | 260/88.1 |
| 3,299,012 | 1/1967 | Kern | 260/78.5 |
| 3,442,870 | 5/1969 | Lohse | 260/78.3 |

*Primary Examiner*—Joseph L. Schofer
*Assistant Examiner*—Roger S. Benjamin
*Attorney*—Griswold & Burdick, J. Roger Lochhead and Glwynn R. Baker

[57] ABSTRACT

Polyalkylene copolymers containing interlinking beta-lactone groups are prepared by treating an olefin-alkylene carboxylic acid copolymer, containing at least one group of the formula

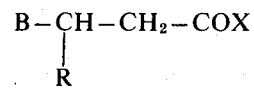

with a tertiary amine to interlink at least two segments of said copolymers through a beta-lactone group of the formula

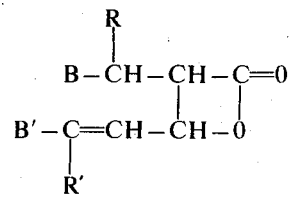

wherein B and B' are segments of the polyalkylene chain; R and R' are H, alkyl, phenyl, COOH, or a segment of the polyalkylene chain; and X is a halogen. The copolymers containing these beta-lactone groups may react further to give rise to insoluble films and coatings, and, further, synergistically improve the performance of textile oil- and water-proofing agents.

8 Claims, No Drawings

REACTIVE BETA-LACTONE-CONTAINING POLYMERS AND A METHOD FOR THEIR PREPARATION

BACKGROUND OF THE INVENTION

The various copolymers utilized to prepare the products of this invention are known to the art, generally being modified or non-modified olefin/acid or olefin/acid halide polymers. They may be prepared according to a number of U.S. patents, including U.S. Pat. Nos. 3,441,545; 3,310,518; 3,361,842 and 3,413,272.

They are typically prepared by polymerizing an alpha olefin, such as ethylene and/or propylene, with an alpha-, beta-ethylenically unsaturated carboxylic acid, in the presence of a catalyst and under superatmospheric pressure. These polymers may then be modified to, for instance, acid halides, esters, amides and the like.

The polymers so made may be utilized as coatings and film-forming materials. However, the polymers of the instant invention are far more reactive than the above prior art polymers, thereby giving them broader utility.

SUMMARY OF THE INVENTION

The invention comprises polyalkylene copolymers containing interlinking beta-lactone groups, and a method for preparing same.

More particularly, the invention comprises polyalkylene copolymers prepared by treating an olefin-alkylene carboxylic acid copolymer, which contains at least one group of the formula

(I)

with a tertiary amine, thereby interlinking at least two segments of said copolymers through a beta-lactone group of the formula

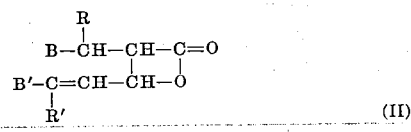
(II)

wherein B and B' are, independently, segments of the polyalkylene chain; R and R' are, independently, H, alkyl groups of up to about 20 carbon atoms, phenyl, COOH, or a segment of the polyalkylene chain; and X is a halogen.

The resulting beta-lactone-containing copolymers may then be further reacted to give rise to insoluble and tenacious films and coatings. Further, a synergism is observed with regard to the oil- and water-repellent properties of certain textile agents when combined with the copolymers of this invention.

The copolymers of this invention may suitably have a molecular weight of from about 1,500 to those of high polymers, and preferably a molecular weight of from about about 2,000 to about 5,000.

It is to be understood that the position of the ethylenic double bond (—C = C—) in the above formula is for illustration and may be transitory, i.e., the bond may shift farther away from the beta-lactone ring if a

group is available.

DETAILED DESCRIPTION OF THE INVENTION

The polyalkylene precursor polymers utilized in this invention may suitably be derived from monomers, or mixtures thereof, which are ethylenically unsaturated and polymerizable. These monomers are well known in the art and include such compounds as alkenes and alkadienes, such as ethylene, propylene, butene, isobutene, pentene, hexene, octene, butadiene, isoprene, etc., (the term alkenes is intended to also include cycloalkenes, such as cyclohexene); unsaturated esters, such as acrylate-and methacrylate-containing monomers, such as alkyl and cycloalkyl (one to 20 carbon atoms) acrylates and methacrylates, such as methyl methacrylate, ethyl acrylate, t-butyl acrylate, 2-ethylhexyl methacrylate, cyclohexyl acrylate and the like; vinyl acetate, vinyl propionate, vinyl butyrate, dimethyl maleate, diethyl maleate, ethyl hydrogen maleate, monoethyl fumarate and diethyl fumarate; nitriles and amides containing unsaturated groups, such as acrylonitrile, methacrylonitrile, acrylamide and methacrylamide; olefinically unsaturated carboxylic acids, such as acrylic acid, methacrylic acid, maleic acid, fumaric acid, itaconic acid and cinnamic acid; and chlorinated and brominated derivatives of the above.

There is the requirement, however, that the monomers used to prepare the precursor polymers of this invention contain at least about 4 to 5 weight percent, based on total starting polymer, of one or more monomers which will result in, or may be modified to, one or more groups pendant from, or terminal to, the polymer backbone, said groups being of formula (I) above.

Examples of said monomers include acrylic acid, itaconic acid, cinnamic acid, crotonoic acid, 3-butenoic acid, 4-pentenoic acid, 3-pentenoic acid, 5-hexenoic acid, 4-hexenoic acid, 3-hexenoic acid, and the like, and the acid halides thereof.

It is to be noted that B and B' may be a single polymer chain, thereby resulting in a "cyclic" polymer.

The copolymers of this invention, then, may suitably be prepared by contacting about 0.005 to 20.0 weight percent (preferably 1.0 to 2.0 weight percent) of the acid halide-containing polymer in a suitable inert solvent, with agitation and under substantially anhydrous conditions at no more than about 60°C. (preferably 20° to 30°C.), with a tertiary amine compound. The beta-lactone-containing polymer results.

The preferred copolymers of this invention include those which are derived by the above method from precursor polymers of the general formula $^A(35-95$ weight percent) $^B(0-40$ weight Percent) $^C(5-25$ weight percent) $^D(0-30$ weight percent), A, B, C and D suitably being in any order, wherein A is ethylene, B is propylene, C is acrylic acid, and D is at least one of methyl acrylate, ethyl acrylate, methyl methacrylate, ethyl methacrylate, isobutylacrylate, acrylonitrile, and the like. More preferably, propylene is present at from 0 to about 10 weight percent.

Solvents which are suitable in this invention include chlorinated hydrocarbon solvents, such as 1,1,1-trichloroethane, perchloroethylene, ethylene dichloride, methylene chloride, o-dichlorobenzene, and the like, other organic solvents, such as benzene, toluene, dioxane, xylene, heptane and higher aliphatics; alkyl acetates; tetrahydrofuran; fluorohalocarbons, such as trichlorofluoromethane, trifluorotrichloroethane, dibromotetrafluoroethane, tetrachlorodifluoroethane, and those fluorohalocarbons which are suitable for use herein for aerosol applications; and mixtures of the above.

Tertiary amines which are suitable include trialkyl and triaralkyl amines, such as trimethylamine, triethylamine, triisopropylamine, diethylmethylamine, ethylmethylpropylamine and tribenzylamine; tertiary cyclic amines, such as N-ethylpiperidine, N-isopropylpiperidine, N-methylhexahydroazepine, N-ethylpyrrolidine; and tertiary polyalkylenepolyamines, such as N,N'-diethyl-N,N'-dimethylethylenediamine.

It is to be noted that the amount of residual acid halide groups desired on the beta-lactone-containing polymer, if any, will dictate the amount of tertiary amine to be utilized. If it is desired to lactonize all, or substantially all, the above groups, generally a slight excess over equivalency is to be utilized. Generally from about 1 to 100 amine equivalents per acid halide equivalent are suitable, while 3 to 5 are preferred.

Pressure is not a critical variable in the lactonization process taught herein, and may suitably be super-, sub- or atmospheric pressures.

It is to be noted that these beta-lactone-containing polymers will generally cross-link in storage when the concentration of said polymer in solvent exceeds about 4 to 6 weight percent. However, the polymers may be made in concentrations of up to 20 weight percent and then diluted. Even if partial cross-linking occurs, the remaining reactive groups may be utilized as taught herein. Also, heating the solution above about 60°C. for a period of time in excess of about one hour will also result in cross-linking. Further, addition to the solution of a non-solvent (such as acetone, pentane and the like) may cause a concentration of the polymer in excess of the above tolerable limits, thereby resulting in cross-linking.

The cross-linked polymer is extremely solvent resistant, no apparent solubilizing effects having been observed after several hours of refluxing one such polymer with toluene.

The amine-salt reaction product may be regenerated by treatment with excess caustic or the like. Care should be exercised during amine-salt recovery (such as by filtration) to avoid polymer concentration which could result in cross-linking.

Under anhydrous conditions in a solvent, a 1–2 percent polymer solution may be stored for one or more months.

A continuous or non-continuous film may be formed from the polymers taught herein by treating a non-reactive substrate in well-known ways. For instance, a substrate, such as glass, metals, and the like, may be dipped into, or sprayed with, a solution of the polymer, the excess solvent removed, and the polymer cross-linked by a brief thermal cure (150°C. for 3 minutes, for instance).

The beta-lactone-containing polymers of this invention find further utility as extenders for oil-and water-repellent agents, such as fluorocarbons, resulting in a synergistic improvement in oil- and/or water-repellency. Textiles to which such properties may be imparted include cotton, wool, cotton-wool blends, dacron, rayon, nylon, silk, and the like.

The textile is impregnated, for instance by spraying, dipping, padding, etc., with (a) a co-application of the repellent and the polymers taught herein, or (b) first with the polymer and then the repellent, the application in either case being in a solvent such as those named above. The excess solvent is then removed by evaporation, using heat and gaseous flow to accelerate evaporation if desired. The impregnated textile is then subjected to a brief thermal cure, such as 3 minutes at 150°C., to cause cross-linking.

A textile so treated shows far better water-and/or oil-repellency than one treated with the repellent alone, even when using as little as 0.5 weight percent pickup of the compounds of this invention, thereby permitting the desired effect on the textile with much less of the expensive repellent. For further details, see co-pending application Ser. No. 10,008, entitled "Process and Composition for Water- and Oil-Proofing Textiles," filed concurrently herewith, Attorney's Docket No. C-14,512.

SPECIFIC EMBODIMENTS

Example 1

260 gm. of ethylene-propylene-acrylic acid grease (61.6 percent ethylene, 21.7 percent propylene, 16.7 percent acrylic acid; molecular weight = 1,650) was used in the preparation of ethylene-propylene-acrylyl chloride grease by refluxing the grease with 500 ml. of thionyl chloride in toluene solution for 3 hours at 110°C. The acid chloride-containing grease was then isolated by stripping off volatiles under reduced pressure. A 5 percent solution of the grease in carbon tetrachloride was then treated by a dropwise addition of a 100 percent excess (2:1 molar ratio of triethylamine to acrylyl chloride) of triethylamine at room temperature, the addition and reaction time totalling 2 hours. A yellow solution was obtained and the triethylamine hydrochloride salt precipitated. The salt was removed by filtration. The yellow filtrate was found by infrared analysis to contain about 5 percent by weight of a polymer rich in beta-lactone groups and having small amounts (ca. 3 to 5 weight percent) of residual acid chloride groups. Unreacted triethylamine was also present in the solution, but did not impair the usefulness of the solution.

Example 2

A number of beta-lactone-containing polymers were prepared by a general procedure as follows:

A. A polymer containing acid groups was dissolved in an inert, anhydrous organic solvent;
B. A portion of the acid groups were esterified with the indicated alcohol;
C. The remaining acid groups were converted to acid halides by the above method;
D. An excess (from 3 to 5 equivalents/equivalent) of triethylamine was added, with agitation of the solution and protection against atmospheric moisture, the temperature being about room temperature in all cases;

E. The reaction was allowed to proceed to completion, generally about 2 hours. The use of heat and pressure were not necessary;

F. The precipitated tertiary amine salt (formed during the reaction) was separated from the reaction mixture by filtration or decanting;

G. The solution (filtrate) contained the beta-lactone-containing polymer, which could then be stored in anhydrous containers pending use.

The nature of the precursor polymer (the types of monomers used and their weight percent in the polymer), the molecular weight of the precursor polymer and the weight percent of the total polymer which is represented by $\beta$-lactone functions after lactonization are all given in the following table. It is to be noted that while only triethylamine was used, similar results would be achieved with the other amines enumerated above.

TABLE I

Precursor Copolymer Monomers

| No. | Ethylene/Propylene: Wt. % | Acrylyl Cloride: Wt. % | Other Type | Wt. % | total Mol. Wt. | Wt. % $\beta$-Lactone in Product* |
|---|---|---|---|---|---|---|
| 1 | 74.7 | 17.4 | n-propyl acrylate | 7.9 | 1785 | 14.2 |
| 2 | 68.0 | 5.6 | n-dodecyl acrylate | 26.0 | 1870 | 4.4 |
| 3 | 77.9 | 19.5 | myristyl acrylate | 3.6 | 1780 | 16.6 |
| 4 | 78.3 | 16.0 | methyl acrylate | 5.7 | 1790 | 13.0 |
| 5 | 78.5 | 18.4 | ethyl acrylate | 3.1 | 1780 | 15.0 |
| 6 | 78.4 | 19.7 | isopropyl acrylate | 1.9 | 1780 | 16.1 |
| 7 | 76.2 | 17.9 | cyclohexyl acrylate | 5.9 | 1780 | 14.5 |
| 8 | 76.8 | 19.9 | t-butyl acrylate | 1.8 | 1780 | 16.2 |
| 9 | 75.2 | 17.4 | benzyl acrylate | 7.4 | 1790 | 14.1 |
| 10 | 74.4 | 16.7 | 1-heptyl acrylate | 8.9 | 1790 | 13.5 |
| 11 | 77.2 | 19.5 | 2-octyl acrylate | 3.3 | 1780 | 15.9 |
| 12 | 78.9 | 20.4 | t-amyl acrylate | 0.7 | 1780 | 16.7 |
| 13 | 74.5 | 18.1 | n-decyl acrylate | 7.4 | 1785 | 14.7 |
| 14 | 75.8 | 15.5 | crotyl acrylate | 8.7 | 1790 | 9.0 |
| 15 | 68.0 | 5.6 | n-dodecyl acrylate | 26.0 | 1820 | 4.4 |
| 16 | 75.6 | 20.6 | cetyl acrylate | 3.8 | 1780 | 4.1 |

*$\beta$-lactone products are roughly dimeric with respect to precursor

Example 3

A set of 1 × 1 inch samples of aluminum and copper foils were degreased with trichloroethane. They were then dipped into a trichloroethane solution of a $\beta$-lactone-containing polymer (3 percent by weight), said polymer being 63 weight percent ethylene, 22 weight percent propylene and 15 weight percent $\beta$-lactone groups. The solvent was then evaporated under a heat lamp to deposit a polymer film on the samples. The coated samples were then heat cured for 3 minutes at 150° C. to complete the cross-linking of the polymer.

The treated samples were then treated with concentrated HCl (38 percent), and then with 5N HCl. The resistance of the metals to the acids was greatly improved. The film was quite transparent, and was found to be resistant to solvents including trichloroethane, perchloroethylene, toluene, benzene and methylene chloride.

Example 4

A glass plate (1 ¼ inch square × 2 mm. thick) was coated with the above-described $\beta$-lactone polymer in the same manner. The coated glass surface was placed in contact with the open end of a Pyrex glass cylinder 1 inch in diameter and 6 inches long. The glass composite was heated for 30 minutes at 150°C. to effect a thorough cross-linking of the polymer. After cooling it was observed that a tenacious, water impermeable bond was achieved between the glass surfaces. The bond was found to be resistant to the action of the above solvents. It could, however, be removed by burning the glass at about 1,500°F.

I claim:

1. A polyalkylene copolymer, wherein the molecular weight is at least about 1500, containing segments which are interlinked by at least one beta-lactone group of the formula

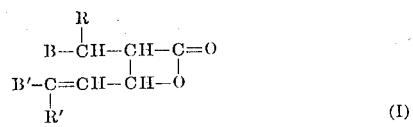

(I)

wherein B and B' are, independently, segments of the polyalkylene chain, and R and R' are, independently, H, alkyl groups of up to about 20 carbon atoms, phenyl, COOH, or a segment of the polyalkylene chain.

2. The copolymer of claim 1 wherein the molecular weight is from about 2,000 to about 5,000.

3. The copolymers of claim 1 wherein B or B' is a segment of a copolymer derived from one or more precursor polymers of the formula $^A$(35–95 weight percent) $^B$(0–40 weight percent) $^C$(5–25 weight percent) $^D$(0–30 weight percent), A, B, C and D suitably being in any order, wherein A is ethylene, B is propylene, C is acrylic acid, and D is at least one of methyl acrylate, ethyl acrylate, methyl methacrylate, ethyl methacrylate, isobutyl acrylate or acrylonitrile.

4. A process for preparing the polyalkylene copolymer of claim 1 which comprises contacting, at no more than about 60°C., a 0.005 to 20.0 weight percent solution of an olefin-alkylene carboxylic acid copolymer containing at least one group of the formula

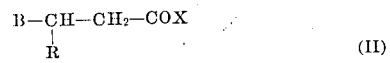

(II)

wherein B is a segment of the polyalkylene chain, R is H, an alkyl group of up to about 20 carbon atoms, phenyl, COOH, or a segment of the polyalkylene chain, and X is a halogen, with an amount of a tertiary amine sufficient to convert at least one of the groups of formula (II) to the beta-lactone groups of formula I in claim 1.

5. The process of claim 4 wherein the polymer has a concentration in the solution of from 1 to 2 weight percent.

6. The process of claim 4 wherein the reaction temperature is from 20° to 30°C.

7. The process of claim 4 wherein 1 to 100 equivalents of amine are utilized per acid equivalent.

8. The process of claim 7 wherein 3 to 5 equivalents are utilized.

* * * * *